United States Patent
Ekambaram et al.

(10) Patent No.: US 10,170,153 B2
(45) Date of Patent: Jan. 1, 2019

(54) AUTO-ADJUSTING INSTRUCTIONAL VIDEO PLAYBACK BASED ON COGNITIVE USER ACTIVITY DETECTION ANALYSIS

(71) Applicant: INTERNATIONAL BUSINESS MACHINES CORPORATION, Armonk, NY (US)

(72) Inventors: Vijay Ekambaram, Bangalore (IN); Roger C. Snook, Charles Town, WV (US); Leigh A. Williamson, Austin, TX (US); Shinoj Zacharias, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/463,136

(22) Filed: Mar. 20, 2017

(65) Prior Publication Data
US 2018/0268865 A1 Sep. 20, 2018

(51) Int. Cl.
G11B 27/00 (2006.01)
G06F 3/01 (2006.01)
G06K 9/00 (2006.01)
G11B 27/10 (2006.01)

(52) U.S. Cl.
CPC .......... G11B 27/005 (2013.01); G06F 3/017 (2013.01); G06K 9/00758 (2013.01); G11B 27/10 (2013.01)

(58) Field of Classification Search
CPC ............................. G11B 27/005; G06F 3/017
See application file for complete search history.

(56) References Cited

U.S. PATENT DOCUMENTS

| 2005/0075213 A1* | 4/2005 | Arick .................. A63B 24/00 482/1 |
| 2007/0189724 A1 | 8/2007 | Wan et al. |
| 2013/0036353 A1* | 2/2013 | Zavesky .......... G06F 17/30056 715/716 |

(Continued)

OTHER PUBLICATIONS

Zheng et al., "Human Activity Detection in Smart Home Environment with Self-Adaptive Neural Networks", IEEE International Conference on Networking, Sensing and Control, Apr. 6-8, 2008, (Abstract Only).

(Continued)

*Primary Examiner* — Thai Q Tran
*Assistant Examiner* — Girumsew Wendmagegn
(74) *Attorney, Agent, or Firm* — Michael Petrocelli, Esq.; Kevin P. Radigan, Esq.; Heslin Rothenberg Farley & Mesiti P.C.

(57) ABSTRACT

An approach is provided for auto-adjusting instructional video playback based on cognitive user activity detection analysis. The approach includes, for instance, providing for playback an instructional video, including a series a steps to accomplish one or more tasks, and monitoring, during playback of the instructional video, progress of a user through the series of steps. The monitoring includes, at least in part, video monitoring the user, and using an activity detection analysis to detect, based on the monitoring, actions by the user as the user progresses through the series of steps. Playback of the instructional video is automatically adjusted based on the activity detection analysis to match the progress of the user through the series of steps.

10 Claims, 7 Drawing Sheets

(56) References Cited

U.S. PATENT DOCUMENTS

2013/0089845 A1    4/2013   Hutchinson
2014/0207450 A1*   7/2014   LaVoie ............... H04N 21/4542
                                                                       704/235
2015/0098691 A1    4/2015   Avrahami et al.
2017/0147906 A1*   5/2017   Shekhar ............. G06K 9/00751

OTHER PUBLICATIONS

Jusoh et al., "Semantic Extraction from Texts", International Conference on Computer Engineering and Applications, Jun. 6-8, 2009, (13 pages).

DeSilva, "Multi-sensor based human activity detection for smart homes", International Universal Communication Symposium, Dec. 3-4, 2009, (Abstract only).

Sung et al., "Robot Learning Lab", http://pr.cs.cornell.edu/humanactivities/, Cornell University, 2009, (2 pages).

Mel, et al., "The NIST Definition of Cloud Computing," National Institute of Standards and Technology, Information Technology Laboratory, Special Publication 800-145, Sep. 2011, (pp. 1-7).

IBM, "z/Architecture Principles of Operation," IBM® Publication No. SA22-7832-10, Eleventh Edition, Mar. 2015, (pp. 1-1732).

IBM, "Power ISA™ Version 2.07B," International Business Machines Corporation, Apr. 9, 2015, (pp. 1-1527).

Anonymous, "CCExtractor", http://ccextractor.sourceforge.net/about-ccextractor.html, Version 0.79, Jan. 13, 2016, (5 pages).

\* cited by examiner

AUTO-ADJUSTING INSTRUCTIONAL VIDEO PLAYBACK BASED ON COGNITIVE USER ACTIVITY DETECTION ANALYSIS

BACKGROUND

Instructional videos may be advantageously employed in a number of scenarios to assist a user in performing a task. For instance, there are many content providers that deliver instructional videos, such as a cooking instructional video, by internet channels. Typically, a cooking instruction video may be presented as one continuous streaming video feed that can only be controlled by manual interaction with a standard video player. For tasks that require the use of both hands to perform the activity, such as cooking a recipe, such control of the video stream may be difficult, if not impractical.

Furthermore, different users may use an instructional video, and the users may progress through the steps of the instructional video at varying rates of speed. Some users may maintain pace with the video speed, but many may not, and may require the video to be paused, or to play at a speed that better matches their ability to perform the task instructions. As a further consideration, a user may be interrupted in the middle of following an instructional video, and may later need to resynchronize the instructional video with where the user left off.

SUMMARY

Shortcomings of the prior art are overcome and additional advantages are provided through the provision of a method which includes providing for playback an instructional video which includes a series of steps to accomplish one or more tasks. The method also includes monitoring, during playback of the instructional video, progress of a user through the series of steps. The monitoring includes, at least in part, video monitoring the user and using an activity detection analysis to detect, based on the monitoring, actions by the user as the user progresses through the series of steps. Further, the method includes automatically adjusting, based on the activity detection analysis, the playback of the instructional video to match the progress of the user through the series of steps.

In another aspect, a system is provided which includes a memory, and a processor communicatively coupled to the memory. The system performs a method, including providing for playback an instructional video which includes a series of steps to accomplish one or more tasks. The method also includes monitoring, during playback of the instructional video, progress of a user through the series of steps. The monitoring may include, at least in part, video monitoring the user and using an activity detection analysis to detect, based on the monitoring, actions by the user as the user progresses through the series of steps. Further, the method includes automatically adjusting, based on the activity detection analysis, the playback of the instructional video to match the progress of the user through the series of steps.

In a further aspect, a computer program product for facilitating auto-adjusting instructional video playback is provided. The computer program product includes a computer readable storage medium having computer-readable program code embodied therewith, the computer-readable program code being executable by a processor to perform a method, including: providing for playback an instructional video including a series of steps, with associated instructor-action-semantics, to accomplish one or more tasks; monitoring, during playback of the instructional video, progress of a user through the series of steps, the monitoring including, at least in part, video monitoring the user and using an activity detection analysis to detect, based on the monitoring, actions by the user as the user progresses through the series of steps; and automatically adjusting, based on the activity detection analysis, the playback of the instructional video to match the progress of the user through the series of steps.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The description that follows includes exemplary devices, systems, methods, techniques and instruction sequences that embody techniques of the present invention. However, it should be understood that the described invention may be practiced, in one or more aspects, without the specified details. In other instances, note that known protocols, structures and techniques have not been shown in detail in order not to obscure the invention. Those of ordinary skill in the art will appreciate that the described techniques and mechanisms may be applied to various systems to facilitate providing an auto-adjusting of instructional video playback, in accordance with one or more aspects of the present invention.

Disclosed herein, in one or more aspects, is an auto-adjusting of instructional video playback via, for instance, a cognitive system (also referred to herein as a cognitive video recording engine), performing user activity detection analysis. In many instructional settings, whether due to the task at hand, or the setting, it may be difficult for a user to provide tactile or verbal control on an instructional video playback. For example, verbal control of a video player may not be accessible, or efficient, depending upon the instructional video and/or playback setting. For instance, noise level within the setting for the task may not allow for, or may hinder, verbal control of a video playback device. Also, verbal control of instructional video playback would require the user to divert focus from the task being performed to instructing the playback system.

Figure 1:
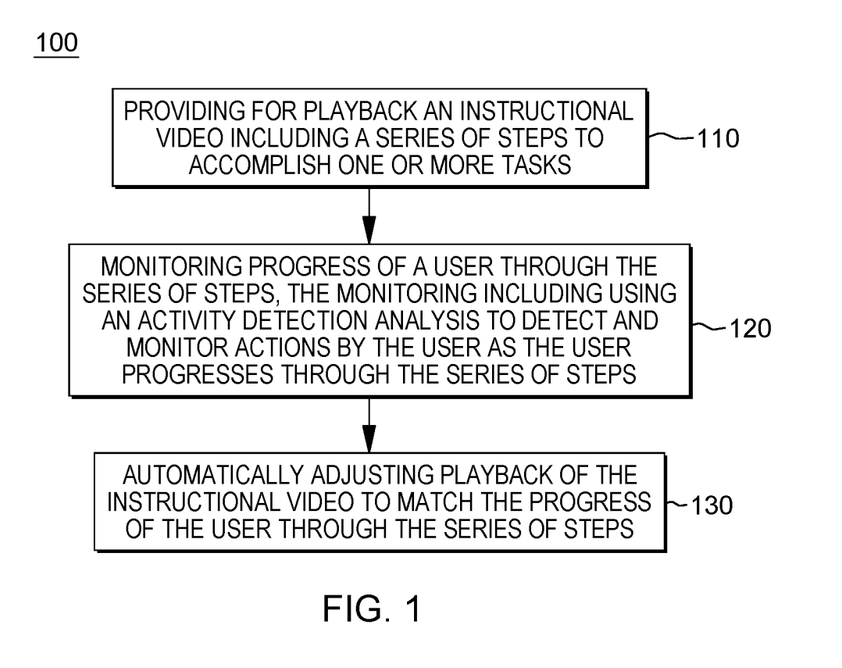
FIG. 1 depicts one embodiment of a process for auto-adjusting instructional video playback, in accordance with one or more aspects of the present invention.

Generally stated, provided herein, in one or more aspects, are methods, systems, and computer program products, which provide auto-adjusting of instructional video playback based on cognitive user activity detection analysis. As depicted in FIG. 1, the processing 100 may include providing for playback an instructional video including a series of steps to accomplish one or more tasks 110, and monitoring, during playback of the instructional video, progress of the user through the series of steps 120. The monitoring may include, at least in part, video monitoring the user, and using an activity detection analysis to detect, based on the monitoring, actions by the user as the user progresses through the series of steps. Further, the processing 100 may include automatically adjusting, based on the activity detection analysis, playback of the instructional video to match the progress of the user through the series of steps 130. One or more embodiments of this processing are described below in greater detail with reference to FIGS. 2-3C.

Note that although illustrated herein in association with a cooking instructional video, the instructional video being controlled may be any instructional video, such as, for instance, for machinery maintenance or repair, automotive repair, aircraft repair, engine repair, cooking, etc. More particularly, the concepts disclosed herein may be used in association with any instructional video task where the user performing the task may need to use both hands and maintain a level of concentration on the task which makes interaction with a computer or video system impractical. Maintenance or repair of sensitive or expensive equipment, delicate assembly of magnified components, heavy equipment assembly or repair, are all examples where auto-adjusting or auto-pacing the video instruction delivery increases the user's productivity and avoids accidents. Advantageously, the auto-adjusting facility disclosed herein paces the instructional video at the exact pace required for a particular user.

In one or more aspects, instructor-action-semantics, that is a set of tags or action steps, are attached to an instructional video at points along the instructional video stream, and activity monitors are used to identify when the user is performing tasks that match a particular instructor-action-semantic (i.e., tag or action step) in the process of performing the steps. As explained herein, there are several techniques for employing monitoring mechanisms, such as mobile or wearable monitoring mechanisms, in order to learn where a user is within a series of activities that will need to be performed when following an instructional video. During playback, the cognitive system may continually compare the instructor-action-semantics with ascertained user-action semantics to determine what step a user is currently performing in the instructional video, and automatically adjust speed of the video to maintain pace with the user. Advantageously, the auto-adjusting (or auto-pacing) facility disclosed herein avoids the disruption to the flow of activity that would otherwise occur when a user has to stop and enter data into a system before a next step proceeds, which is cognitively dissonant and causes loss of concentration by the user in performing the task at hand. The facility disclosed herein avoids this disruption and loss of focus by smoothly tracking and auto-pacing the instructional video based on progress of the user in real-time.

Figure 2:
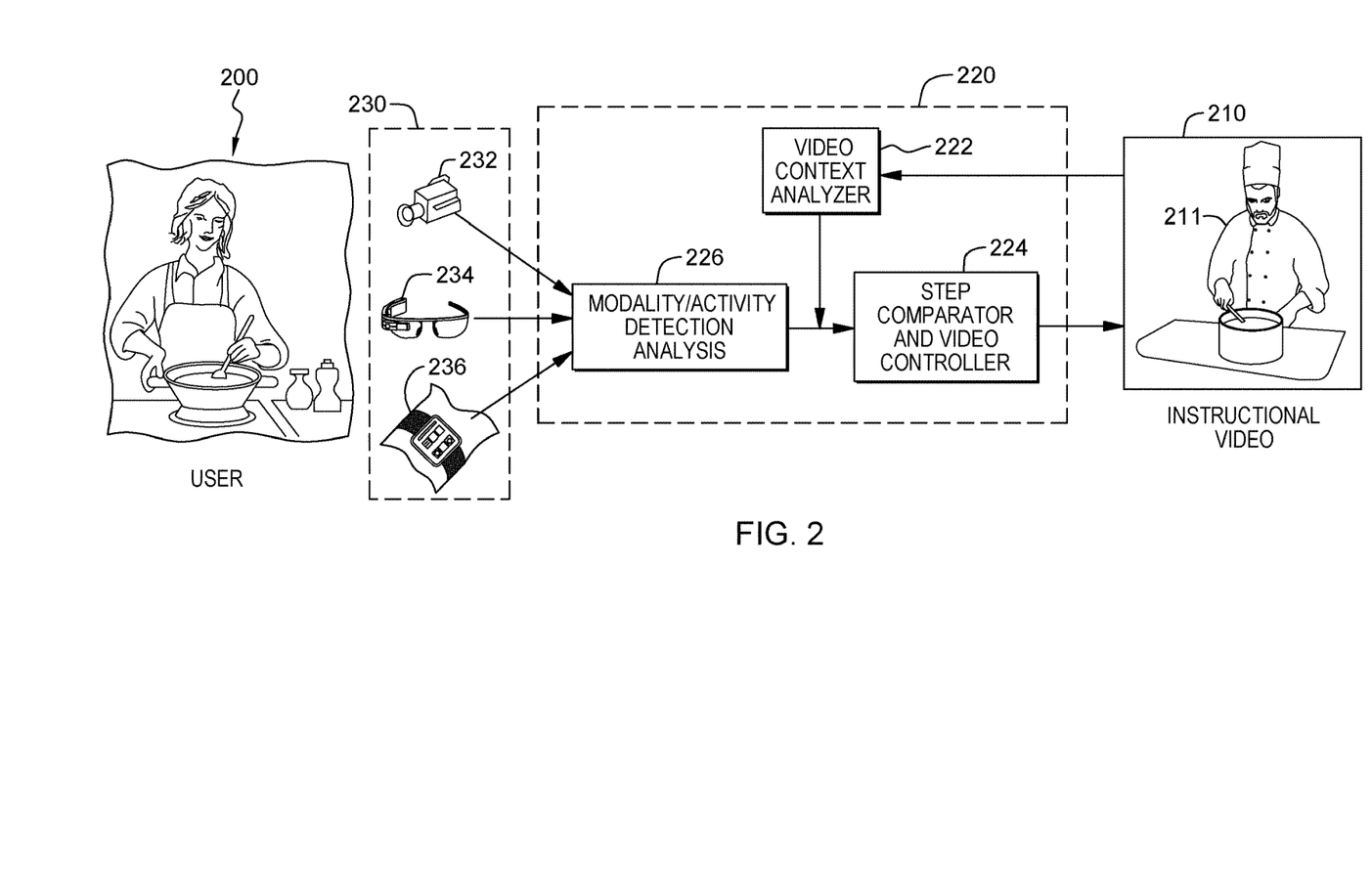
FIG. 2 illustrates use of one embodiment of an auto-adjusting instructional video playback system, in accordance with one or more aspects of the present invention.

FIG. 2 illustrates one embodiment of an auto-adjusting instructional video playback system 220 which facilitates maintaining synchronization of playback of an instructional video 210 with progress of a user 200 through the series of steps of the one or more tasks within the instructional video. As noted, in one or more embodiments, a method, system and computer program product are disclosed herein which temporally coordinate user-action-semantics extracted from one or more activity sensors (including a video sensor) with instructor-action-semantics associated with the instructional video to automatically adjust video playback for better synchronization of the playback with the user who is following the instructional video. Using the approach described herein, speed of the instructional video may be automatically adjusted based on the progress or speed of the user following the video, which makes the guided instructional process simpler for the user to follow.

In one or more embodiments, the instructional video 210 may include one or more instructors 211, and the auto-adjusting instructional video playback system 220 may have a video context analyzer 222 which, in one or more embodiments, references instructor-action-semantics associated with the instructional video. As explained further below, the instructor-action-semantics may include respective timestamps relative to the instructional video playback.

One or more monitors 230, including a video monitor 232, and if desired, one or more other activity monitors such as monitors 234, 236 worn by user 200 may be used to provide data to the system. In the embodiment depicted, monitor 234 may be, for instance, an eyeglass monitor which may facilitate monitoring activity of the user, in one or more implementations, as well as potentially displaying of the instructional video, and monitor 236 may be, for example, a wrist worn monitor. Those skilled in the art will understand that other monitors may be associated with user 200 or one or more objects interacted with by user 200 in performing the series of steps to facilitate in determining progress of user 200 through the series of steps. For instance, in one or more embodiments, smart home and wearable sensors, such as a smart watch, video surveillance camera, home/kitchen sensors, etc. may be used to capture actions, and semantics of actions done by the user.

The data provided by one or more monitors 230 is fed to a modality/activity detection analysis 226 facility of system 220 which, as noted herein, ascertains semantics for user action steps in the data to obtain user action semantics, and for each user-action-semantic, logs a start time. Step comparator and video controller 224 compares the user's actions to the series of steps of the instructional video to determine the progress of the user through the series of steps, including a current step the user is performing, and progress of the user within the current step. This comparing may include comparing the instruction-action-semantics associated with the instructional video with the ascertained user-action semantics, and based on the comparing identifying a variation, automatically adjusting playback of the instructional video to match or synchronize a playback of the instructional video with the progress of the user through the series of steps. That is, the system at run time may compare the action steps of the instructor(s) with those of the user(s), and based on the comparison may play, pause, slow down, speed up, rewind, etc. playback of the instructional video. Advantageously, speed of the instructional video is automatically adjusted based on progress of the user which (as noted) makes the guided instructional process simpler to follow. As described herein, the monitoring and automatic adjustment of playback of instructional video may be absent any verbal or tactile feedback on progress of the user through the series of steps.

Note that, in one or more implementations, one or more aspects of auto-adjusting video playback system 220 may be implemented or performed by a cognitive system. For instance, cognitive system analysis may be utilized in obtaining the user-action semantics and/or the instructor-action-semantics, as described herein. By way of example, in one or more implementations, the cognitive system may be a cloud-based system. One such cognitive system is the Watson™ system available from International Business Machines Corporation of Armonk, N.Y., USA. The Watson™ system is an application of advanced natural language processing, information retrieval, knowledge representation and reasoning, and machine-learning technologies in the field of open domain question answering. The Watson™ system is built on International Business Machines Corporation's DeepQA™ technology used for hypothesis generation, massive evidence gathering, analysis, and scoring.

Figure 3A:
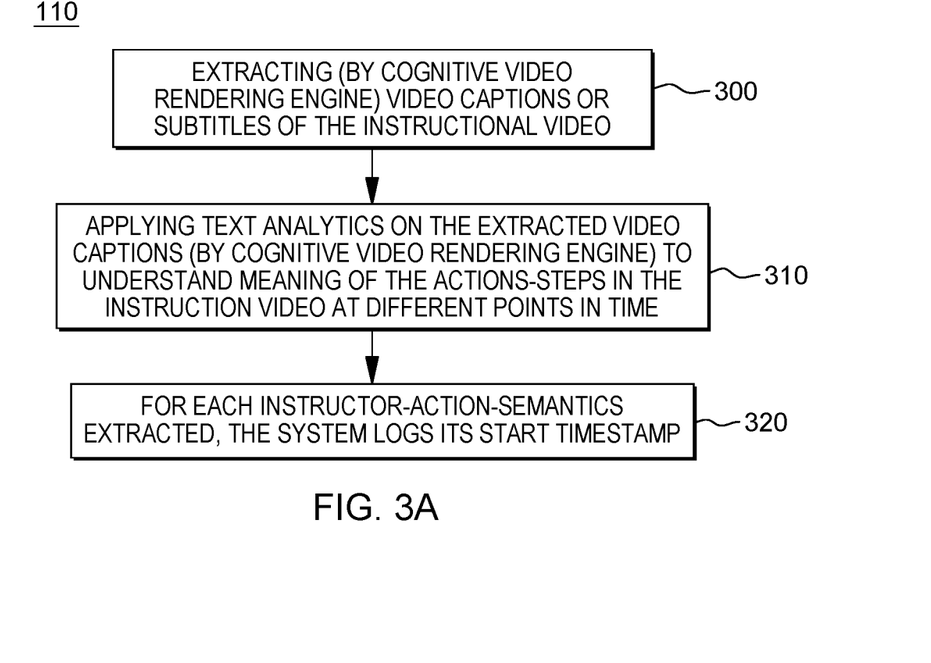
FIG. 3A depicts further details of one embodiment of providing for playback an instructional video which includes a series of steps, in accordance with one or more aspects of the present invention.

FIG. 3A depicts, by way of example, a more detailed embodiment for providing for playback an instructional video which includes a series of steps to accomplish one or more tasks, and has associated therewith instructor-action-semantics with related time stamps. As illustrated in FIG. 3A, providing for playback the instructional video 110 may include extracting by a cognitive system video captions or subtitles of the instructional video 300. There are various enabling technologies which could generate captions or subtitles for video which may be used in this process. For instance, cloud delivered video service capabilities such as International Business Machines Corporation's Ustream and/or Clearleap, may be used. Further, automated video tagging and control insertion is being performed on a routine basis for advertising purposes. A similar automated process could be used to tag the steps of an instructional video, that is, to provide the instructor-action-semantics discussed herein. Alternatively, the instructional video could have been created with video captions or subtitles already in place.

As shown, text analytics may be applied to the extracted video captions by the cognitive system to understand the meaning of the action-steps in the instruction video at different points in time 310. This action produces a plurality of instructor-action-semantics associated with the instructional video. Existing semantic extraction algorithms for text may be utilized to identify more finer semantics where desired. Further, in one or more embodiments, the instructional video could be crowd sourced, and using manual labeling processes, accuracy of the process could be improved. For every instructor-action-semantic extracted, the system logs a start timestamp relative to the instructional video playback 320. Note that, in one or more other embodiments, the instructional video may have been separately produced with the associated instructor-action-semantics and respective timestamps for use in auto-adjusting the instructional video playback based on cognitive user activity detection analysis, as described herein.

Figure 3B:
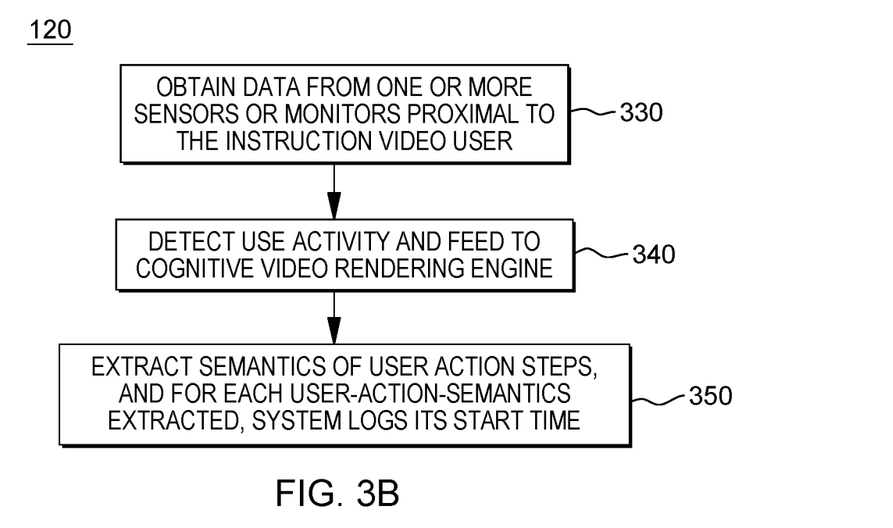
FIG. 3B depicts further details of one embodiment of monitoring progress of a user through the series of steps, including extracting user-action-semantics, in accordance with one or more aspects of the present invention.

FIG. 3B depicts further details of one embodiment of monitoring progress of a user through the series of steps 120, including for instance, extracting user-action-semantics. As illustrated, the process may include obtaining data from one or more activity sensors or monitors proximal to the instructional video user 330, and as noted, the one or more sensors may include one or more video monitors that monitor the user's progress through the series of steps, as well as, for instance, one or more activity monitors, such as wearable sensors, smartwatches, smart glasses, etc. as well as (for instance). In addition, one or more object or device sensors, such as one or more home or kitchen sensors in the case of a cooking instructional video, may be employed. For instance, in one or more implementations, Internet of Things (IoT) sensors may also be used. Human activity modality is detected and fed to the cognitive video rendering engine 340. Various technologies exist which can facilitate detecting user activity or modality. For instance, objects in a smart kitchen may emit identifiers through radio frequency channels, and based on this information, it can be determined which objects within the kitchen the user is interacting with. For instance, "the user interacted with salt container." By correlating the activity modalities of the user with various interacting objects in the environment (e.g. which emit identifiers) software can determine various semantics of the user-action steps 350. These smart collected user-action-semantics may be fed to the cognitive system, for instance, through existing communication channels. For each user-action-semantics extracted, the system may also log a start time 350.

Figure 3C:
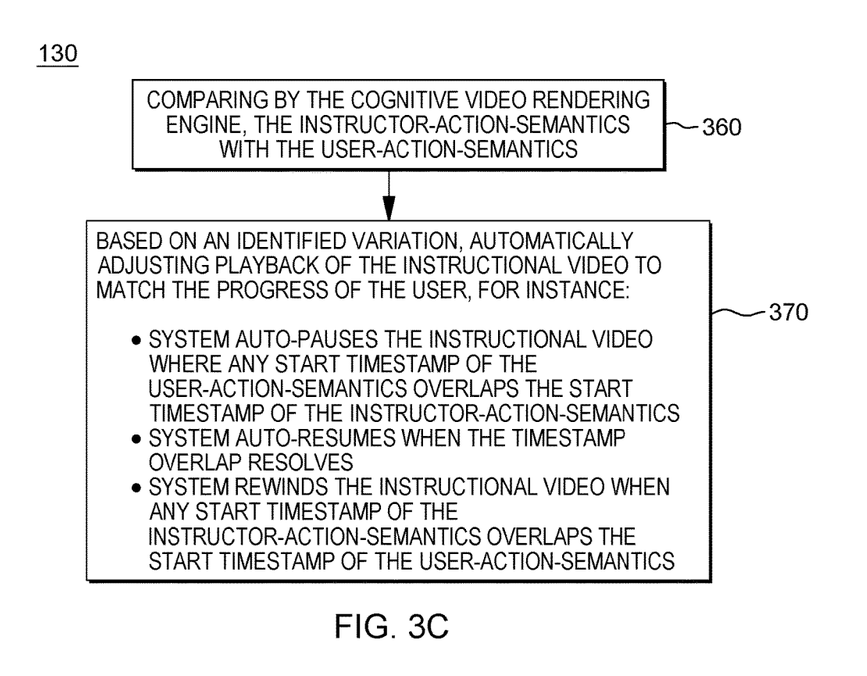
FIG. 3C depicts further details of one embodiment of automatically adjusting playback of an instructional video to match progress of a user through a series of steps, in accordance with one or more aspects of the present invention.

FIG. 3C depicts further details of one embodiment for automatically adjusting playback of an instructional video to match progress of a user through a series of steps 130. As shown, the process may include comparing by the cognitive system the instructor-action-semantics (e.g., obtained from the process of FIG. 3A) with the user-action-semantics (e.g., obtained from the process of FIG. 3B) 360. Based on any identified variation between the two, the system may automatically adjust playback of the instructional video to match the progress of the user 370. For instance, the automatic adjustment may include auto-pausing the instructional video when any start timestamp of the user-action-semantics overlaps the start time stamp of the instructor-action-semantics, and the system may auto-resume playback when the timestamp overlap resolves. Further, the system may rewind the video playback when any start timestamp of the instructor-action-semantics overlaps the start timestamp of the user-action-semantics.

Those skilled in the art will note from the above description that provided herein is a facility for temporally correlating user-action-semantics extracted from one or more activity sensors associated with or in proximity to the user, or one or more objects or devices being interacted with by the user, with instructor-action-semantics extracted from the instructional video, for instance, from video captions of the instructional video. Using the temporal correlation approach, speed of the instructional video playback may be automatically adjusted for better synchronization with the user's progress through the steps of the instructional video. This allows auto-adjustment of the instructional video playback without any tactile or verbal feedback required on the part of the user or another individual.

Further exemplary embodiments of a computing environment to implement one or more aspects of the present invention are described below with reference to FIGS. 4-6.

Figure 4:
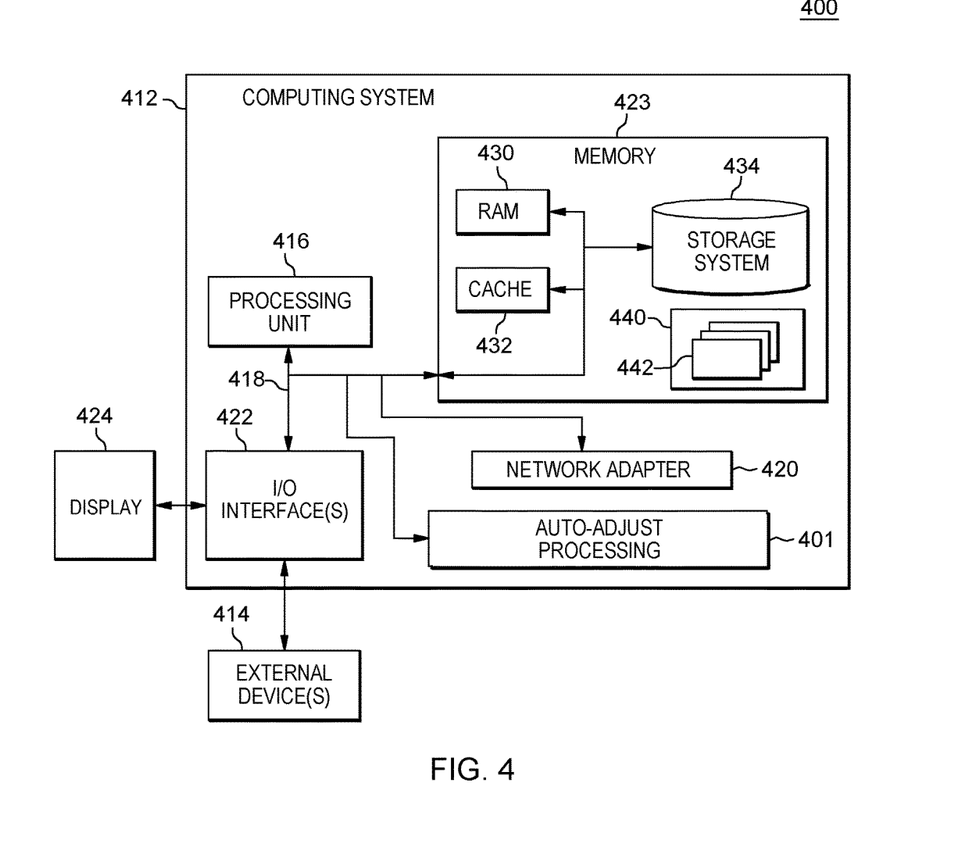
FIG. 4 depicts one embodiment of a computing system which may implement or facilitate implementing auto-adjusting instructional video playback processing, in accordance with one or more aspects of the present invention.

By way of further example, FIG. 4 depicts one embodiment of a computing environment 400, which includes a computing system 412. Examples of well-known computing systems, environments, and/or configurations that may be suitable for use with computer system 412 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 412 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 4, computing system 412, is shown in the form of a general-purpose computing device. The components of computing system 412 may include, but are not limited to, one or more processors or processing units 416, a system memory 423, and a bus 418 that couples various system components including system memory 423 to processor 416.

In one embodiment, processor 416 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 412 may include a variety of computer system readable media. Such media may be any available media that is accessible by computing system 412, and it includes both volatile and non-volatile media, removable and non-removable media.

System memory 423 can include computer system readable media in the form of volatile memory, such as random access memory (RAM) 430 and/or cache memory 432. Computing system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 418 by one or more data media interfaces. As described below, memory 423 may include at least one program product having a set (e.g., at least one) of program modules that are configured to carry out the functions of embodiments of the invention.

Program/utility 440, having a set (at least one) of program modules 442, may be stored in memory 432 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Alternatively, An auto-adjusting instructional video playback system, module, logic, etc., 401 may be provided within computing environment 412.

Computing system 412 may also communicate with one or more external devices 414 such as a keyboard, a pointing device, a display 424, etc.; one or more devices that enable a user to interact with computing system 412; and/or any devices (e.g., network card, modem, etc.) that enable computing system 412 to communicate with one or more other computing devices. Such communication can occur via Input/Output (I/O) interfaces 422. Still yet, computing system 412 can communicate with one or more networks such as a local area network (LAN), a general wide area network (WAN), and/or a public network (e.g., the Internet) via network adapter 420. As depicted, network adapter 420 communicates with the other components of computing system, 412, via bus 418. It should be understood that although not shown, other hardware and/or software components could be used in conjunction with computing system 412. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 4. Computer system/server 412 of FIG. 4 may be practiced in distributed cloud computing environments where tasks are performed by remote processing devices that are linked through a communications network. In a distributed cloud computing environment, program modules may be located in both local and remote computer system storage media including memory storage devices. Computer system/server 412 is capable of being implemented and/or performing any of the functionality set forth hereinabove.

Figure 5:
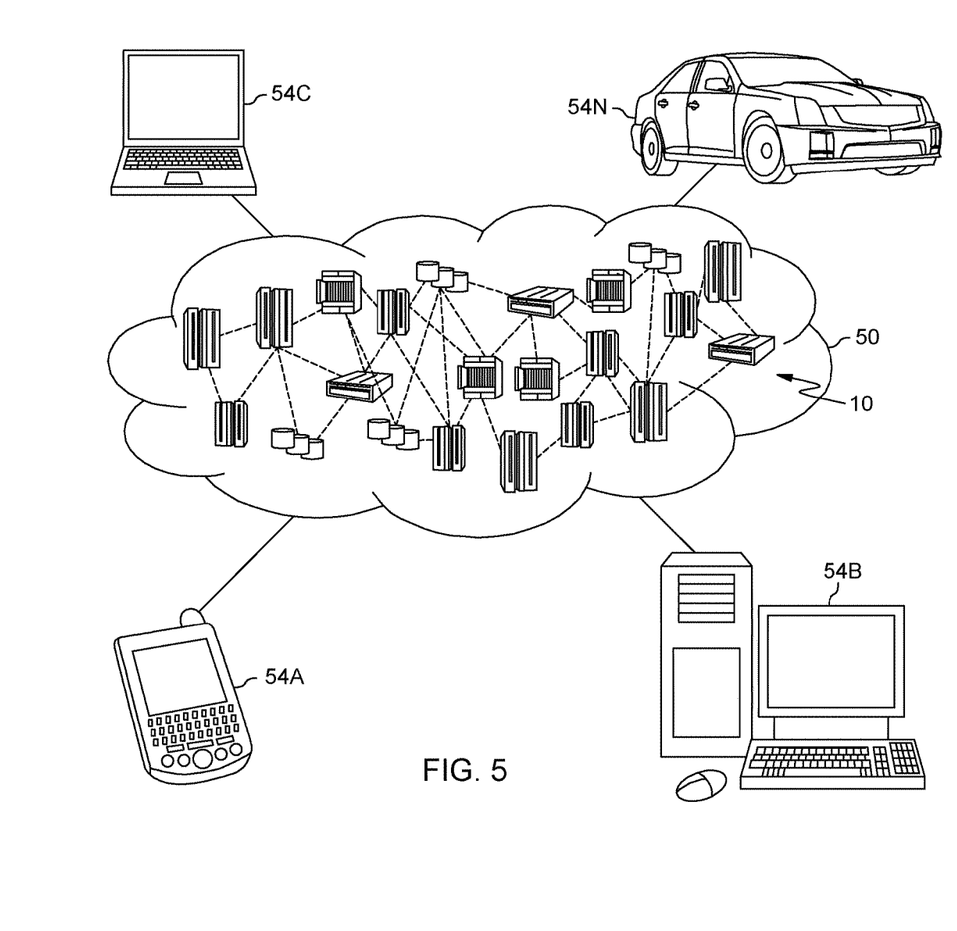
FIG. 5 depicts one embodiment of a cloud computing environment which may facilitate implementing, or be used in association with, with one or more aspects of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
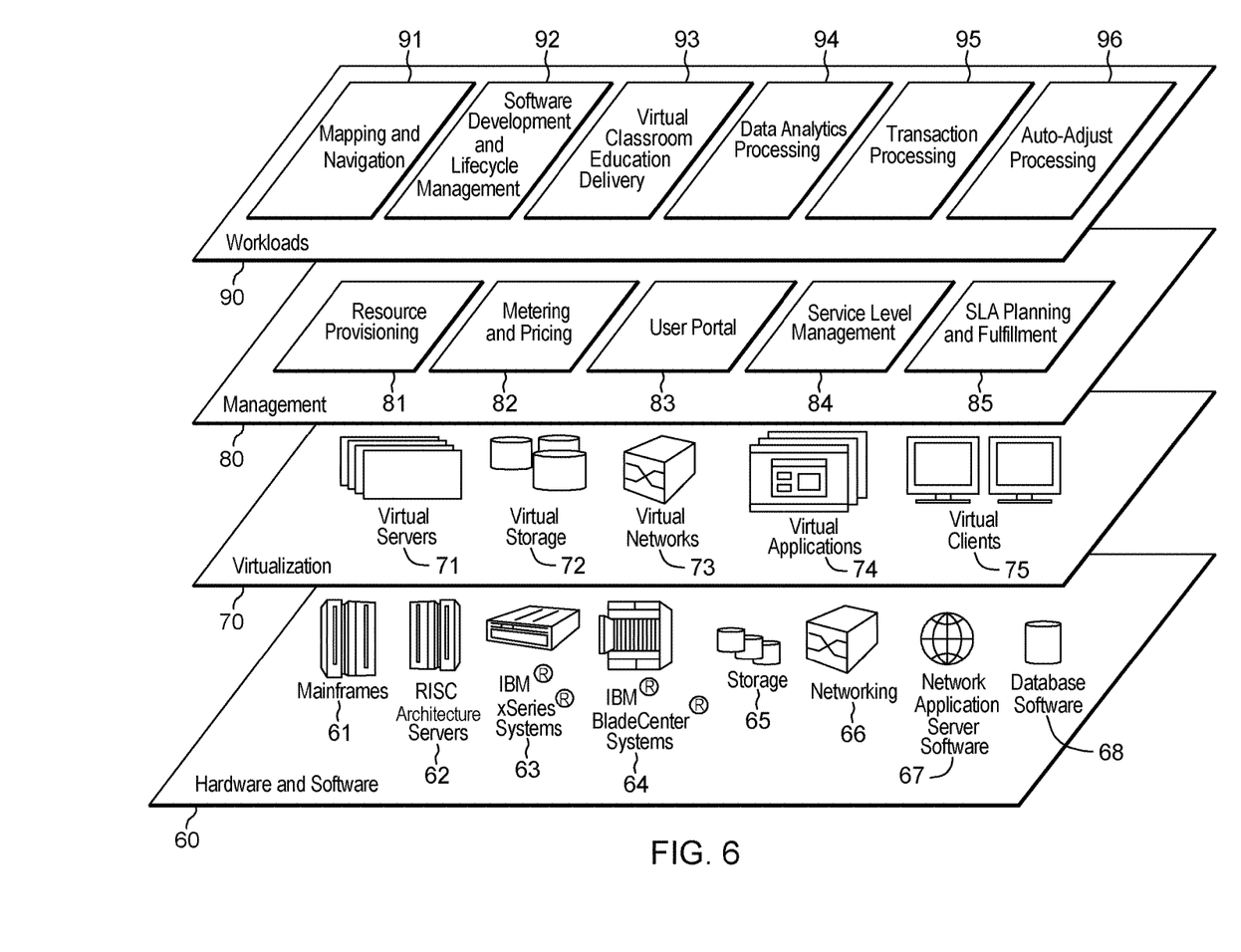
FIG. 6 depicts an example of extraction model layers, which may facilitate implementing auto-adjusting instructional video playback processing, in accordance with one or more aspects of the present invention.

Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and auto-adjust instructional video playback processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   providing for playback an instructional video comprising a series of steps to accomplish one or more tasks, the providing comprising identifying the series of steps, the identifying comprising:
      ascertaining, by a cognitive system, instructor-action-semantics for the instructional video across different points in time, the ascertaining comprising:
         extracting, by the cognitive system, video captions for instructor-actions within the instructional video; and
         applying, by the cognitive system, text analysis to the extracted video captions to understand semantics of the instructor-actions in the instructional video at different points in time to derive the instructor-action-semantics;
      for each instructor-action-semantic, logging a start timestamp relative to the instructional video;
   monitoring, during playback of the instructional video, progress of a user through the series of steps, the monitoring comprising, at least in part, video monitoring the user and using an activity detection analysis to detect, based on the monitoring, actions by the user as the user progresses through the series of steps, wherein the activity detection analysis comprises:
      extracting user action steps from data provided by the monitoring;
      ascertaining semantics for user action steps in the data to obtain user-action-semantics; and
      for each user-action-semantic, logging a start timestamp; and
   automatically adjusting, based on the activity detection analysis, the playback of the instructional video to match the progress of the user through the series of steps, wherein the automatically adjusting comprises:
      comparing the instructor-action-semantics with the user-action-semantics; and
      based on the comparing identifying a variation, automatically synchronizing playback of the instructional video to match the progress of the user through the series of steps of the instructional video, the automatically synchronizing using the logged start timestamps for the user-action-semantics in comparison with the logged timestamps for the instructor-action-semantics to determine whether any logged start timestamp of the user-action-semantics overlaps a current start timestamp of the instructor-action-semantics, or whether any start timestamp of the instructor-action-semantics overlaps a current start timestamp of the user-action-semantics.

2. The method of claim 1, wherein the monitoring uses one or more activity monitors, including a video monitor, and the monitoring is absent verbal or tactile feedback on progress of the user through the series of steps.

3. The method of claim 2, wherein the activity detection analysis comprises:
   extracting user action steps from data provided by the one or more activity monitors; and
   ascertaining semantics for the user action steps in the data to obtain user-action-semantics.

4. The method of claim 2, wherein the automatically adjusting comprises comparing the user's actions to the series of steps of the instructional video to determine the progress of the user through the series of steps, including a current step the user is performing and progress of the user within that current step.

5. The method of claim 1, wherein the video monitoring of the user provides a video stream, and the activity detection analysis comprises cognitively analyzing the video stream to ascertain the user's progress through the series of steps.

6. The method of claim 5, wherein the activity detection analysis further detects the user's progress through the series of steps via one or more activity monitors worn by the user.

7. A system comprising:
   a memory; and
   a processor communicatively coupled to the memory, wherein the system performs a method comprising:
      providing for playback an instructional video comprising a series of steps to accomplish one or more tasks, the providing comprising identifying the series of steps, the identifying comprising:
         ascertaining, by a cognitive system, instructor-action-semantics for the instructional video across different points in time, the ascertaining comprising:
            extracting, by the cognitive system, video captions for instructor-actions within the instructional video; and
            applying, by the cognitive system, text analysis to the extracted video captions to understand semantics of the instructor-actions in the instructional video at different points in time to derive the instructor-action-semantics;
         for each instructor-action-semantic, logging a start timestamp relative to the instructional video;
      monitoring, during playback of the instructional video, progress of a user through the series of steps, the monitoring comprising, at least in part, video monitoring the user and using an activity detection analysis to detect, based on the monitoring, actions by the user as the user progresses through the series of steps, wherein the activity detection analysis comprises:
         extracting user action steps from data provided by the monitoring;
         ascertaining semantics for user action steps in the data to obtain user-action-semantics; and
         for each user-action-semantic, logging a start timestamp; and
      automatically adjusting, based on the activity detection analysis, the playback of the instructional video to match the progress of the user through the series of steps, wherein the automatically adjusting comprises:
         comparing the instructor-action-semantics with the user-action-semantics; and
         based on the comparing identifying a variation, automatically synchronizing playback of the instructional video to match the progress of the user through the series of steps of the instructional video, the automatically synchronizing using the logged start timestamps for the user-action-semantics in comparison with the logged timestamps for the instructor-action-semantics to determine whether any logged start timestamp of the user-action-semantics overlaps a current start timestamp of the instructor-action-semantics, or whether any start timestamp of the instructor-action-semantics overlaps a current start timestamp of the user-action-semantics.

8. The system of claim 7, wherein the monitoring uses one or more activity monitors, including a video monitor, and the monitoring is absent verbal or tactile feedback on progress of the user through the series of steps.

9. The system of claim 8, wherein the activity detection analysis comprises:
   extracting user action steps from data provided by the one or more activity monitors; and
   ascertaining semantics for the user action steps in the data to obtain user-action-semantics.

10. A computer program product for facilitating auto-adjusting instructional video playback, the computer program product comprising:
   a computer readable storage medium having computer readable program code embodied therewith, the computer-readable program code being executable by a processor to perform a method comprising:
      facilitating providing for playback an instructional video comprising a series of steps, with associated instructor-action-semantics, to accomplish one or more tasks, the providing comprising identifying the series of steps, the identifying comprising:
         ascertaining, by a cognitive system, instructor-action-semantics for the instructional video across different points in time, the ascertaining comprising:
            extracting, by the cognitive system, video captions for instructor-actions within the instructional video; and
            applying, by the cognitive system, text analysis to the extracted video captions to understand semantics of the instructor-actions in the instructional video at different points in time to derive the instructor-action-semantics;
         for each instructor-action-semantic, logging a start timestamp relative to the instructional video;
      monitoring, during playback of the instructional video, progress of a user through the series of steps, the monitoring comprising, at least in part, video monitoring the user and using an activity detection analysis to detect, based on the monitoring, actions by the user as the user progresses through the series of steps, wherein the activity detection analysis comprises:
         extracting user action steps from data provided by the monitoring;
         ascertaining semantics for user action steps in the data to obtain user-action-semantics; and
         for each user-action-semantic, logging a start timestamp; and
      automatically adjusting, based on the activity detection analysis, the playback of the instructional video to match the progress of the user through the series of steps, wherein the automatically adjusting comprises:
         comparing the instructor-action-semantics with the user-action-semantics; and
         based on the comparing identifying a variation, automatically synchronizing playback of the instructional video to match the progress of the user through the series of steps of the instructional video, the automatically synchronizing using the logged start timestamps for the user-action-semantics in comparison with the logged timestamps for the instructor-action-semantics to determine whether any logged start timestamp of the user-action-semantics overlaps a current start timestamp of the instructor-action-semantics, or whether any start timestamp of the instructor-action-semantics overlaps a current start timestamp of the user-action-semantics.

\* \* \* \* \*